(12) United States Patent
Buonocunto et al.

(10) Patent No.: US 12,081,414 B2
(45) Date of Patent: Sep. 3, 2024

(54) NETWORK FUNCTION MANAGEMENT

(71) Applicant: Telefonaktiebolaget LM Ericsson (publ), Stockholm (SE)

(72) Inventors: Antonio Buonocunto, Angri (IT); Vincenzo Paparo, Torre Annunziata (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 95 days.

(21) Appl. No.: 17/795,106

(22) PCT Filed: Jan. 31, 2020

(86) PCT No.: PCT/EP2020/052503
§ 371 (c)(1),
(2) Date: Jul. 25, 2022

(87) PCT Pub. No.: WO2021/151514
PCT Pub. Date: Aug. 5, 2021

(65) Prior Publication Data
US 2022/0376992 A1    Nov. 24, 2022

(51) Int. Cl.
*H04L 41/28* (2022.01)
*H04L 41/0816* (2022.01)
*H04L 41/0853* (2022.01)

(52) U.S. Cl.
CPC .......... *H04L 41/28* (2013.01); *H04L 41/0816* (2013.01); *H04L 41/0853* (2013.01)

(58) Field of Classification Search
CPC .. H04L 41/28; H04L 41/0816; H04L 41/0853
USPC ........................................................ 709/220
See application file for complete search history.

(56) References Cited

U.S. PATENT DOCUMENTS

2009/0013010 A1*  1/2009  Fang ................... H04L 67/02
                                                    707/999.203
2017/0272523 A1   9/2017  Cillis et al.

FOREIGN PATENT DOCUMENTS

EP        3255839 A1     12/2017

OTHER PUBLICATIONS

ETSI, "Standards for NFV—Network Functions Virtualisation | NFV Solutions", https://www.etsi.org/technologies/nfv, 2020, 1-44.
Unknown, "ETSI GS NFV-MAN 001 V1.1.1", Network Functions Virtualisation (NFV); Management and Orchestration, Dec. 2014, 1-184.

* cited by examiner

*Primary Examiner* — Lan Dai T Truong
(74) *Attorney, Agent, or Firm* — Murphy, Bilak & Homiller, PLLC

(57) ABSTRACT

There is provided a method for network function management. The method is performed by a node of a first network. The method comprises activating (100) a first version of a network function only if activation of the first version of the network function is allowed by a gateway that is configured to allow the first network and a second network to communicate.

20 Claims, 12 Drawing Sheets

NETWORK FUNCTION MANAGEMENT

TECHNICAL FIELD

The disclosure relates to methods for network function management and nodes configured to operate in accordance with the methods.

BACKGROUND

With the need to adhere to "Continuous Delivery and Deployment" principles, there is an increasing number of official releases for each network function (NF) and these official releases are being delivered in a relatively short amount of time.

The releases can be created for delivery to the customer together with bug fixes and/or a security patch. The releases can also be delivered in a different form depending on the environment (e.g. virtual machine, microservice, physical server) in which they are to be executed. For example, once a virtual network function (VNF) is released by a software vendor, a VNF Package may be delivered by any customer according to the European Telecommunications Standards Institute (ETSI) network functions virtualization (NFV) architecture.

However, in a software based paradigm, it is impossible to have full control over each release that is delivered for each network function. Currently there is no mechanism for the network function vendor to prevent usage of a specific release. This can be particularly problematic in a scenario where critical issues are associated with a specific release, such as issues that may compromise customer data and/or impact the vendor's business. For example, if a customer stores the software in their own registry/repository, the customer can re-deploy the software in their environment at any moment, even if the specific version of the software is affected by a critical flaw.

SUMMARY

It is an object of the disclosure to obviate or eliminate at least some of the above-described disadvantages associated with existing techniques.

Therefore, according to an aspect of the disclosure, there is provided a method for network function management. The method is performed by a node of a first network. The method comprises activating a first version of a network function only if activation of the first version of the network function is allowed by a gateway that is configured to allow the first network and a second network to communicate.

There is thus provided an advantageous method for network function management. The technique introduces a new mandatory step that forces a node to obtain permission from a (e.g. local or remote) gateway for the activation of a network function. The activation of the network function can only proceed if permission is granted by the gateway. In this way, the use of specific versions of the network function that cause issues (e.g. major security flaws, issues for customer data and/or issues for the network function provider) can be prevented and thus those issues can be avoided. This can improve the security and/or functionality of the node.

In some embodiments, the method may comprise initiating transmission of a request towards the gateway for permission to activate the first version of the network function and activating the first version of the network function only if a response from the gateway to the request is indicative that activation of the first version of the network function is allowed.

In some embodiments, the request may comprise information uniquely identifying the first version of the network function.

In some embodiments, the method may comprise activating the first version of the network function only if a record generated by the gateway comprises information indicative that activation of the first version of the network function is allowed.

In some embodiments, the method may be performed at deployment of the network function, at restart of the network function, and/or at predetermined time intervals.

In some embodiments, the method may comprise, if activation of the first version of the network function is denied by the gateway, repeating the method in respect of at least one second version of the network function.

In some embodiments, the at least one second version of the network function may be a later release of the first version of the network function.

In some embodiments, the method may be repeated until reaching a version of the network function for which activation is allowed.

In some embodiments, the method may comprise, if activation of the first version of the network function is denied by the gateway and a third version of the network function is currently activated, continuing to activate the third version of the network function.

In some embodiments, the third version of the network function may be an earlier release of the first version of the network function.

In some embodiments, the first network may comprise the gateway, the second network may comprise the gateway, or the gateway may be remote from the first network and the second network.

In some embodiments, the first network may be a network of a consumer of the network function and/or the second network may be a network of a provider of the network function.

According to another aspect of the disclosure, there is provided a node of a first network. The node comprises processing circuitry configured to operate in accordance with the method described earlier in respect of the node. The node thus provides the advantages discussed earlier in respect of the method performed by the node. In some embodiments, the node may comprise at least one memory for storing instructions which, when executed by the processing circuitry, cause the node to operate in accordance with the method described earlier in respect of the node.

According to another aspect of the disclosure, there is provided another method of managing network functions. The method is performed by a gateway. The gateway is configured to allow a first network and a second network to communicate. The method comprises allowing or denying activation of a first version of a network function by a node of the first network.

There is thus provided an advantageous method for network function management. The technique introduces a new mandatory step that requires a gateway to grant permission for the activation of a network function by a node. The activation of the network function by the node can only proceed if permission is granted by the gateway. In this way, the use of specific versions of the network function that cause issues (e.g. major security flaws, issues for customer data and/or issues for the network function provider) can be prevented and thus those issues can be avoided. This can improve the security and/or functionality of the node.

In some embodiments, the method may comprise allowing or denying activation of the first version of the network function by the node of the first network in response to a request for permission for the node of the first network to activate the first version of the network function and initiating transmission of a response towards the node of the first network indicative of whether activation of the first version of the network function by the node of the first network is allowed or denied.

In some embodiments, the request may comprise information uniquely identifying the first version of the network function.

In some embodiments, the method may comprise generating a record comprising information indicative of whether activation of the first version of the network function by the node of the first network is allowed or denied.

In some embodiments, the method may be performed at deployment of the network function, at restart of the network function, and/or at predetermined time intervals.

In some embodiments, allowing or denying activation of the first version of the network function by the node of the first network may be based on whether an issue is identified with the first version of the network function.

In some embodiments, the method may comprise allowing activation of the first version of the network function by the node of the first network in the absence of an issue being identified with the first version of the network function or denying activation of the first version of the network function by the node of the first network if an issue is identified with the first version of the network function.

In some embodiments, the issue may be a security issue and/or a functional issue.

In some embodiments, allowing or denying activation of the first version of the network function by the node of the first network may be based on a length of time since release of the first version of the network function.

In some embodiments, the method may comprise allowing activation of the first version of the network function by the node of the first network if the length of the time since release of the first version of the network function is less than a predefined threshold length of time or denying activation of the first version of the network function by the node of the first network if the length of the time since release of the first version of the network function is equal to or more than the predefined threshold length of time.

In some embodiments, the method may comprise, if activation of the first version of the network function by the node of the first network is denied, repeating the method in respect of at least one second version of the network function.

In some embodiments, the at least one second version of the network function may be a later release of the first version of the network function.

In some embodiments, the method may be repeated until reaching a version of the network function for which activation by the node of the first network is allowed.

In some embodiments, the first network may comprise the gateway, the second network may comprise the gateway, or the gateway may be remote from the first network and the second network.

In some embodiments, the first network may be a network of a consumer of the network function and/or the second network may be a network of a provider of the network function.

According to another aspect of the disclosure, there is provided a gateway. The gateway is configured to allow a first network and a second network to communicate. The gateway comprises processing circuitry configured to operate in accordance with the method described earlier in respect of the gateway. The gateway thus provides the advantages discussed earlier in respect of the method performed by the gateway. In some embodiments, the gateway may comprise at least one memory for storing instructions which, when executed by the processing circuitry, cause the gateway to operate in accordance with the method described earlier in respect of the gateway.

According to another aspect of the disclosure, there is provided a system. The system comprises one or more nodes as described earlier and/or one or more gateways as described earlier. The system thus provides the advantages discussed earlier in respect of the method performed by the node and/or gateway.

According to another aspect of the disclosure, there is provided a computer program comprising instructions which, when executed by processing circuitry, cause the processing circuitry to perform the method described earlier in respect of the node and/or gateway. The computer program thus provides the advantages discussed earlier in respect of the method performed by the node and/or gateway.

According to another aspect of the disclosure, there is provided a computer program product, embodied on a non-transitory machine-readable medium, comprising instructions which are executable by processing circuitry to cause the processing circuitry to perform the method described earlier in respect of the node and/or gateway. The computer program product thus provides the advantages discussed earlier in respect of the method performed by the node and/or the gateway.

Therefore, an advantageous technique for network function management is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

As mentioned earlier, an advantageous technique for network function management is described herein. The technique is implemented by a node and a gateway. Herein, the node may also be referred to as an entity and/or the gateway may also be referred to as an activation gateway. The node referred to herein is a node of a first network.

The gateway referred to herein is configured to allow the first network and a second network to communicate.

The method described herein is performed in respect of a network function. In some embodiments, the network function referred to herein may be a virtual network function (VNF). In some embodiments, the first network may be a network of a consumer of the network function. Alternatively or in addition, in some embodiments, the second network may be a network of a provider (or vendor) of the network function.

In some embodiments, the first network and/or the second network may be an internet protocol multimedia subsystem (IMS) network. In other embodiments, the first network and/or the second network may be a cellular network. For example, in some embodiments the first network and/or the second network may be a radio access network (RAN), such as an evolved universal terrestrial radio access network (E-UTRAN), or any other cellular network. In some embodiments, the cellular network may be a packet data network (PDN). The first network and/or the second network may be a third generation (3G) network, a fourth generation (4G) network, a fifth generation (5G) network, or any other generation network.

Herein, a network function can be defined as a functional block (or component) within the infrastructure of a network. A network function may have a predefined function in the network. That is, a network function may be executable to provide predefined functionality in the network. In some embodiments, a network function may be contained in a deliverable that is used for the deployment of that network function. In some embodiments, the first network referred to herein can comprise one or more network functions in respect of which the method described herein is performed.

Figure 1:
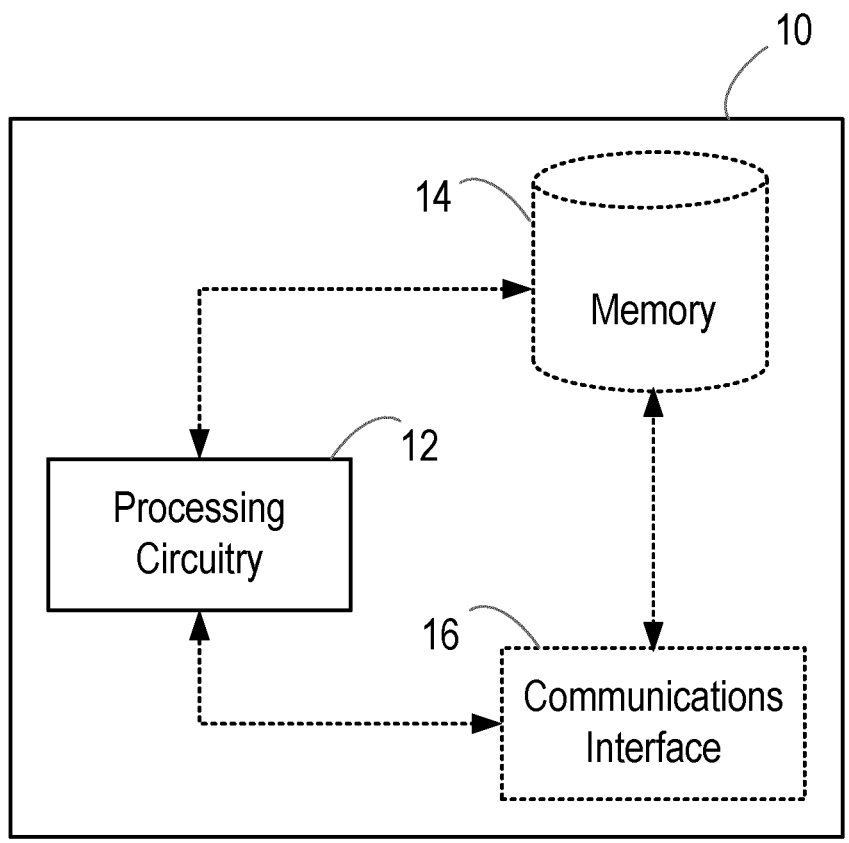
FIG. 1 is a block diagram illustrating a node according to an embodiment.

FIG. 1 illustrates a node 10 of a first network in accordance with an embodiment. The node 10 is for network function management. That is, the node 10 is for managing network functions. The node 10 may, for example, be a physical machine (e.g. a server) or a virtual machine (VM).

As illustrated in FIG. 1, the node 10 comprises processing circuitry (or logic) 12. The processing circuitry 12 controls the operation of the node 10 and can implement the method described herein in respect of the node 10. The processing circuitry 12 can comprise one or more processors, processing units, multi-core processors or modules that are configured or programmed to control the node 10 in the manner described herein. In particular implementations, the processing circuitry 12 of the node 10 can comprise a plurality of software and/or hardware modules that are each configured to perform, or are for performing, individual or multiple steps of the method described herein in respect of the node 10.

Briefly, the processing circuitry 12 of the node 10 is configured to activate a first version of a network function only if activation of the first version of the network function is allowed by a gateway that is configured to allow the first network and a second network to communicate.

As illustrated in FIG. 1, in some embodiments, the node 10 may optionally comprise a memory 14. The memory 14 of the node 10 can comprise a volatile memory or a non-volatile memory. In some embodiments, the memory 14 of the node 10 may comprise a non-transitory media. Examples of the memory 14 of the node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the node 10 can be connected to the memory 14 of the node 10. In some embodiments, the memory 14 of the node 10 may be for storing program code or instructions which, when executed by the processing circuitry 12 of the node 10, cause the node 10 to operate in the manner described herein in respect of the node 10. For example, in some embodiments, the memory 14 of the node 10 may be configured to store program code or instructions that can be executed by the processing circuitry 12 of the node 10 to cause the node 10 to operate in accordance with the method described herein in respect of the node 10. Alternatively or in addition, the memory 14 of the node 10 can be configured to store any information (e.g. records), data, messages, requests, responses, indications, notifications, signals, or similar, that are described herein. The processing circuitry 12 of the node 10 may be configured to control the memory 14 of the node 10 to store information (e.g. records), data, messages, requests, responses, indications, notifications, signals, or similar, that are described herein.

In some embodiments, as illustrated in FIG. 1, the node 10 may optionally comprise a communications interface 16. The communications interface 16 of the node 10 can be connected to the processing circuitry 12 of the node 10 and/or the memory 14 of node 10. The communications interface 16 of the node 10 may be operable to allow the processing circuitry 12 of the node 10 to communicate with the memory 14 of the node 10 and/or vice versa. Similarly, the communications interface 16 of the node 10 may be operable to allow the processing circuitry 12 of the node 10 to communicate with the gateway and/or any other node. The communications interface 16 of the node 10 can be configured to transmit and/or receive information (e.g. records), data, messages, requests, responses, indications, notifications, signals, or similar, that are described herein. In some embodiments, the processing circuitry 12 of the node 10 may be configured to control the communications interface 16 of the node 10 to transmit and/or receive information (e.g. records), data, messages, requests, responses, indications, notifications, signals, or similar, that are described herein.

Although the node 10 is illustrated in FIG. 1 as comprising a single memory 14, it will be appreciated that the node 10 may comprise at least one memory (i.e. a single memory or a plurality of memories) 14 that operate in the manner described herein. Similarly, although the node 10 is illustrated in FIG. 1 as comprising a single communications interface 16, it will be appreciated that the node 10 may comprise at least one communications interface (i.e. a single communications interface or a plurality of communications interface) 16 that operate in the manner described herein. It will also be appreciated that FIG. 1 only shows the components required to illustrate an embodiment of the node 10 and, in practical implementations, the node 10 may comprise additional or alternative components to those shown.

Figure 2:
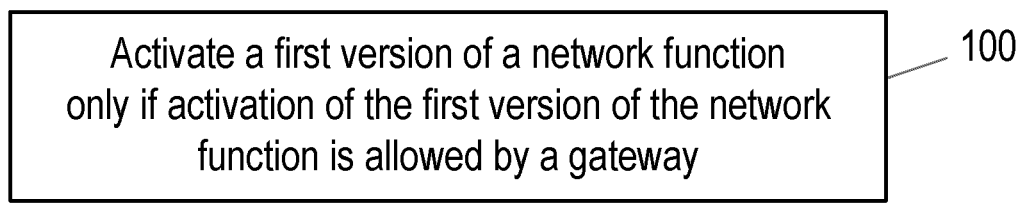
FIG. 2 is a block diagram illustrating a method performed by a node according to an embodiment.

FIG. 2 is a flowchart illustrating a method performed by a node 10 in accordance with an embodiment. The method is for network function management. That is, the method is for managing network functions. The node 10 described earlier with reference to FIG. 1 is configured to operate in accordance with the method of FIG. 2. The method can be performed by or under the control of the processing circuitry 12 of the node 10.

As illustrated at block 100 of FIG. 2, a first version of a network function is activated only if activation of the first version of the network function is allowed by a gateway that is configured to allow the first network and a second network to communicate. More specifically, the processing circuitry 12 of the node 10 activates the first version of the network function only if activation of the first version of the network function is allowed by the gateway.

Thus, the node 10 must be permitted by the gateway to activate the first version of the network function. If permitted by the gateway, the node 10 can activate the first version of the network function. In some embodiments, the method performed by the node 10 may comprise checking whether the node 10 is permitted to activate the first version of the network function. More specifically, in some embodiments, the processing circuitry 12 of the node 10 can be configured to check whether the node 10 is permitted to activate the first version of the network function. This check may be referred to herein as an "activation check". It is only in the case of a positive result that the node 10 will continue with the operation to activate the first version of the network function. The activation of the first version of the network function allows deployment of the first version of the network function to be finalised and the first version of the network function can start to provide its functionality.

The activation check performed by the node 10 can be implemented in various ways. For example, in some embodiments, the method performed by the node 10 may comprise initiating transmission of a request towards the gateway for permission to activate the first version of the network function. More specifically, in some embodiments, the processing circuitry 12 of the node 10 can be configured to initiate transmission of the request (e.g. via a communications interface 16 of the node 10). Herein, the term "initiate" can mean, for example, cause or establish. Thus, the processing circuitry 12 of the node 10 can be configured to itself transmit the request or can be configured to cause another node to transmit the request. In this way, it is possible to provide full control of each release delivered for each network function. It can be ensured that the first version of the network function is not affected by any critical flaws (e.g. any bugs and/or security issues).

In some embodiments, the request may comprise information uniquely identifying the first version of the network function. In this way, the node 10 can provide to the gateway information that will uniquely identify the first version of the network function. This can be advantageous in the versioning control of each release delivered for each network function. In particular, the gateway is provided with information uniquely identifying the first version in order for that specific version to be checked for a possible critical flaw.

In some embodiments, the method performed by the node 10 may comprise activating the first version of the network function only if a response from the gateway to the request is indicative that activation of the first version of the network function is allowed. More specifically, in some embodiments, the processing circuitry 12 of the node 10 can be configured to activate the first version of the network function only if the response from the gateway to the request is indicative that activation of the first version of the network function is allowed. Thus, in some embodiments, the node 10 may interact with the gateway to obtain permission to activate the first version of the network function.

Alternatively, in some embodiments, the method performed by the node 10 may comprise activating the first version of the network function only if a record (e.g. a list) generated by the gateway comprises information indicative that activation of the first version of the network function is allowed. More specifically, in some embodiments, the processing circuitry 12 of the node 10 can be configured to activate the first version of the network function only if the record generated by the gateway comprises information indicative that activation of the first version of the network function is allowed. Thus, in some embodiments, the activation check performed by the node 10 can involve checking the record generated by the gateway. In this way, it is possible to provide full control of each release delivered for each network function. It can be ensured that the first version of the network function is not affected by any critical flaw (e.g. any bugs and/or security issues). The record generated by the gateway may be stored in a memory of the gateway, in a memory 14 of the node 10 itself (i.e. locally), or in the memory of another node. Thus, the node 10 may access the record locally or remotely to perform the activation check. In some embodiments, the record may be signed by the gateway. This enables the node 10 (or another node) to authenticate the source (the gateway) and check the integrity of the record.

In other embodiments, the method performed by the node 10 may comprise activating the first version of the network function only if the response from the gateway to the request is indicative that activation of the first version of the network function is allowed and the record generated by the gateway comprises information indicative that activation of the first version of the network function is allowed.

In some embodiments, if activation of the first version of the network function is denied (or refused) by the gateway, the method described herein in respect of the node 10 may be repeated in respect of at least one second version of the network function. More specifically, in some embodiments, the processing circuitry 12 of the node 10 can be configured to repeat the method. For example, the method described herein in respect of the node 10 may be repeated until reaching a version of the network function for which activation is allowed. In this way, it is possible to check whether multiple versions of network function are affected by any critical flaw. This is advantageous in, for example, the versioning control of each release delivered for each network function. In some of these embodiments, the at least one second version of the network function may be a later (e.g. subsequent) release of the first version of the network function. In this way, a release with more up-to-date functionality can be provided.

Alternatively or in addition, in some embodiments, if activation of the first version of the network function is denied (or refused) by the gateway and a third version of the network function is currently activated, the method performed by the node 10 may comprise continuing to activate the third version of the network function. More specifically, in some embodiments, the processing circuitry 12 of the node 10 can be configured to continue to activate the third version of the network function. In this way, the network function can remain executable to provide its predefined functionality. In some of these embodiments, the third version of the network function may be an earlier (e.g. previous) release of the first version of the network function.

In some embodiments, the method described herein in respect of the node 10 may be performed at deployment (or installation) of the network function, at restart of the network function, and/or at predetermined time intervals (e.g. periodically). By performing the method described herein in respect of the node 10 at restart of the network function and/or at predetermined time intervals, it is possible to check whether the first version of the network function is activatable or not activatable at runtime. Alternatively or in addition, the method described herein in respect of the node 10 may be performed each time a different version of the network function is released. This advantageously provides the possibility to have a continuous control of all new and already installed versions of network function in terms of critical flaw.

Figure 3:
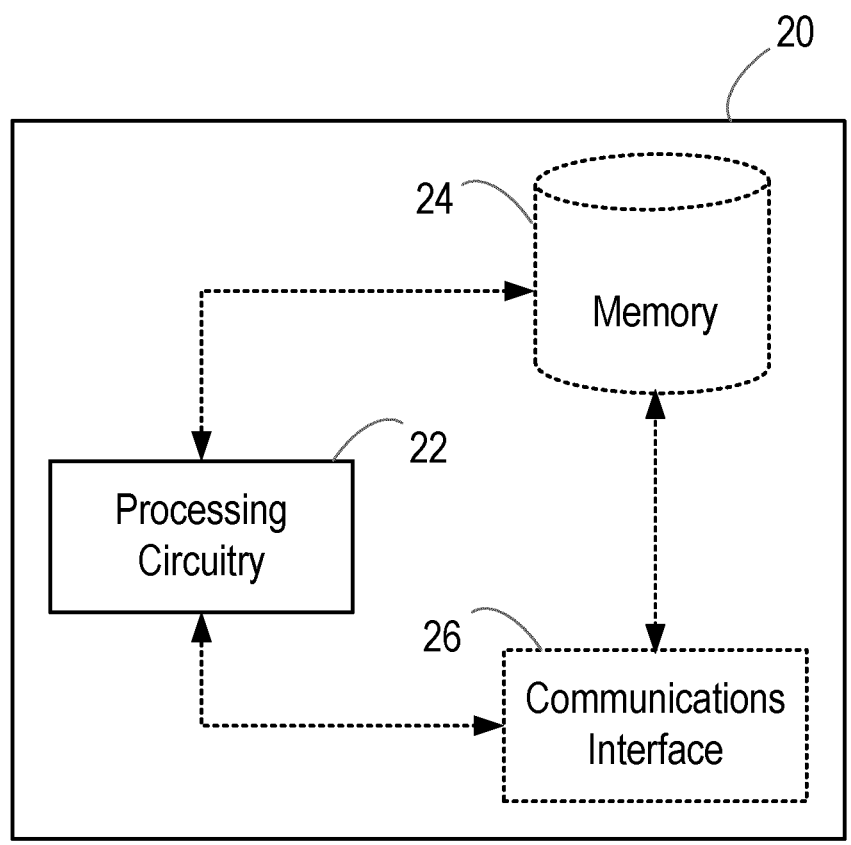
FIG. 3 is a block diagram illustrating a gateway according to an embodiment.

FIG. 3 illustrates a gateway 20 in accordance with an embodiment. The gateway 20 is for network function management. That is, the gateway 20 is for managing network functions. The gateway 20 is configured to allow a first network and a second network to communicate.

In some embodiments, the first network may comprise the gateway 20. Thus, the gateway 20 may be part of the same network as (or local to) the node 10 performing the activation according to some embodiments. In this way, security in respect of the first network can advantageously be improved, since the node 10 is not required to open up the first network to an external network. Alternatively, the gateway 20 may be part of a different network to (or remote from) the node 10 performing the activation according to some embodiments. That is, the gateway 20 may be remote from the first network. For example, in some embodiments, the second network may comprise the gateway 20. In other embodiments, the gateway 20 may be remote from the second network. In some embodiments, the gateway 20 may be remote from both the first network and the second network.

As illustrated in FIG. 3, the gateway 20 comprises processing circuitry (or logic) 22. The processing circuitry 22 controls the operation of the gateway 20 and can implement the method described herein. The processing circuitry 22 can comprise one or more processors, processing units, multi-core processors or modules that are configured or programmed to control the gateway 20 in the manner described herein in respect of the gateway 20. In particular implementations, the processing circuitry 22 of the gateway 20 can comprise a plurality of software and/or hardware modules that are each configured to perform, or are for performing, individual or multiple steps of the method described herein in respect of the gateway 20.

Briefly, the processing circuitry 22 of the gateway 20 is configured to activate a first version of a network function only if activation of the first version of the network function is allowed by a gateway that is configured to allow the first network and a second network to communicate.

As illustrated in FIG. 3, in some embodiments, the gateway 20 may optionally comprise a memory 24. The memory 24 of the gateway 20 can comprise a volatile memory or a non-volatile memory. In some embodiments, the memory 24 of the gateway 20 may comprise a non-transitory media. Examples of the memory 24 of the gateway 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the gateway 20 can be connected to the memory 24 of the gateway 20. In some embodiments, the memory 24 of the gateway 20 may be for storing program code or instructions which, when executed by the processing circuitry 22 of the gateway 20, cause the gateway 20 to operate in the manner described herein in respect of the gateway 20. For example, in some embodiments, the memory 24 of the gateway 20 may be configured to store program code or instructions that can be executed by the processing circuitry 22 of the gateway 20 to cause the gateway 20 to operate in accordance with the method described herein in respect of the gateway 20. Alternatively or in addition, the memory 24 of the gateway 20 can be configured to store any information (e.g. records), data, messages, requests, responses, indications, notifications, signals, or similar, that are described herein. The processing circuitry 22 of the gateway 20 may be configured to control the memory 24 of the gateway 20 to store information (e.g. records), data, messages, requests, responses, indications, notifications, signals, or similar, that are described herein.

In some embodiments, as illustrated in FIG. 3, the gateway 20 may optionally comprise a communications interface 26. The communications interface 26 of the gateway 20 can be connected to the processing circuitry 22 of the gateway 20 and/or the memory 24 of gateway 20. The communications interface 26 of the gateway 20 may be operable to allow the processing circuitry 22 of the gateway 20 to communicate with the memory 24 of the gateway 20 and/or vice versa. Similarly, the communications interface 26 of the gateway 20 may be operable to allow the processing circuitry 22 of the gateway 20 to communicate with the node 10 described earlier and/or any other node. The communications interface 26 of the gateway 20 can be configured to transmit and/or receive information (e.g. records), data, messages, requests, responses, indications, notifications, signals, or similar, that are described herein. In some embodiments, the processing circuitry 22 of the gateway 20 may be configured to control the communications interface 26 of the gateway 20 to transmit and/or receive information (e.g. records), data, messages, requests, responses, indications, notifications, signals, or similar, that are described herein.

Although the gateway 20 is illustrated in FIG. 3 as comprising a single memory 24, it will be appreciated that the gateway 20 may comprise at least one memory (i.e. a single memory or a plurality of memories) 24 that operate in the manner described herein. Similarly, although the gateway 20 is illustrated in FIG. 3 as comprising a single communications interface 26, it will be appreciated that the gateway 20 may comprise at least one communications interface (i.e. a single communications interface or a plurality of communications interface) 26 that operate in the manner described herein. It will also be appreciated that FIG. 3 only shows the components required to illustrate an embodiment of the gateway 20 and, in practical implementations, the gateway 20 may comprise additional or alternative components to those shown.

Figure 4:
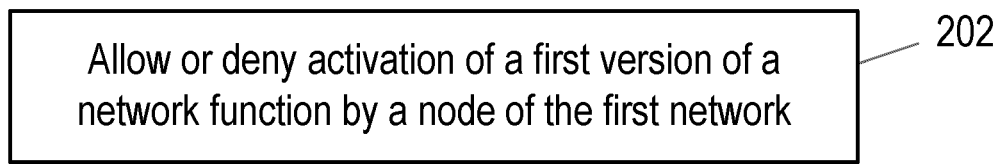
FIG. 4 is a block diagram illustrating a method performed by a gateway according to an embodiment.

FIG. 4 is a flowchart illustrating a method performed by a gateway 20 in accordance with an embodiment. The method is for network function management. That is, the method is for managing network functions. The gateway 20 described earlier with reference to FIG. 3 is configured to operate in accordance with the method of FIG. 4. The method can be performed by or under the control of the processing circuitry 22 of the gateway 20.

As illustrated at block 200 of FIG. 4, activation of a first version of a network function by a node 10 of the first network is allowed or denied (or refused). More specifically, the processing circuitry 22 of the gateway 20 allows or denies (or refuses) activation of a first version of a network function by a node 10 of the first network.

In some embodiments, activation of the first version of the network function by the node 10 of the first network may be allowed or denied based on whether an issue is identified with the first version of the network function. For example, in some embodiments, activation of the first version of the network function by the node 10 of the first network may be allowed in the absence of an issue being identified with the first version of the network function or activation of the first version of the network function by the node 10 of the first network may be denied if an issue is identified with the first version of the network function. In some embodiments, the issue may be a security issue and/or a functional issue.

Alternatively or in addition, in some embodiments, activation of the first version of the network function by the node 10 of the first network may be allowed or denied based on a length of time since release of the first version of the network function. For example, in some embodiments, activation of the first version of the network function by the node 10 of the first network may be allowed if the length of the time since release of the first version of the network function is less than a predefined threshold length of time or activation of the first version of the network function by the node 10 of the first network may be denied if the length of the time since release of the first version of the network function is equal to or more than the predefined threshold length of time. In this way, out of date releases that may be more likely to have issues such as those mentioned earlier can be avoided.

Alternatively or in addition, in some embodiments, activation of the first version of the network function by the node 10 of the first network may be allowed or denied based on a label with which the first version of the network function is marked. For example, in some embodiments, activation of the first version of the network function by the node 10 of the first network may be allowed if the first version of the network function is marked as "activatable" or activation of the first version of the network function by the node 10 of the first network may be denied if the first version of the network function is marked as "not activatable".

In some embodiments, the method performed by the gateway 20 may comprise allowing or denying activation of the first version of the network function by the node 10 of the first network in response to a request for permission for the node 10 of the first network to activate the first version of the network function. In some embodiments, the method performed by the gateway 20 may comprise initiating transmission of a response towards the node 10 of the first network indicative of whether activation of the first version of the network function by the node 10 of the first network is allowed or denied. More specifically, in some embodiments, the processing circuitry 22 of the gateway 20 can be configured to initiate transmission of the response (e.g. via a communications interface 26 of the gateway 20). As mentioned earlier, herein, the term "initiate" can mean, for example, cause or establish. Thus, the processing circuitry 22 of the gateway 20 can be configured to itself transmit the response or can be configured to cause another node to transmit the response. In some embodiments, the request may comprise information uniquely identifying the first version of the network function.

Alternatively or in addition, in some embodiments, the method performed by the gateway 20 may comprise generating a record (e.g. a list) comprising information indicative of whether activation of the first version of the network function by the node 10 of the first network is allowed or denied. More specifically, in some embodiments, the processing circuitry 22 of the gateway 20 can be configured to generate the record. In some embodiments, the record may be signed by the gateway 20.

In some embodiments, the method performed by the gateway 20 may comprise storing the record in a memory (e.g. a memory 24 of the gateway 20). More specifically, in some embodiments, the processing circuitry 22 of the gateway 20 can be configured to control a memory (e.g. a memory 24 of the gateway 20) to store the record. Thus, the record can be stored locally at the gateway 20 according to some embodiments. In these embodiments, the record can be remotely accessed by the node 10. Alternatively or in addition, in some embodiments, the record may be a downloadable record. For example, the record may be downloaded by the node 10. The record may be stored in a memory 14 of the node 10. In these embodiments, the record can be locally accessed by the node 10. In other embodiments, another node may store the record for the node 10 to remotely access.

In some embodiments, if activation of the first version of the network function by the node 10 of the first network is denied, the method described herein in respect of the gateway 20 may be repeated in respect of at least one second version of the network function. More specifically, in some embodiments, the processing circuitry 22 of the gateway 20 can be configured to repeat the method. For example, the method described herein in respect of the gateway 20 may be repeated until reaching a version of the network function for which activation by the node 10 of the first network is allowed. In some of these embodiments, the at least one second version of the network function may be a later (e.g. subsequent) release of the first version of the network function.

In some embodiments, the method described herein in respect of the gateway 20 may be performed at deployment of the network function, at restart of the network function, and/or at predetermined time intervals (e.g. periodically). By performing the method described herein in respect of the gateway 20 at restart of the network function and/or at predetermined time intervals, it is possible to check whether the first version of the network function is activatable or not activatable at runtime. Alternatively or in addition, the method described herein in respect of the gateway 20 may be performed each time a different version of the network function is released.

There is also provided a system for network function management. That is, the system is for managing network functions. The system can comprise one or more nodes 10 as described herein and/or one or more gateways 20 as described herein.

Figure 5:
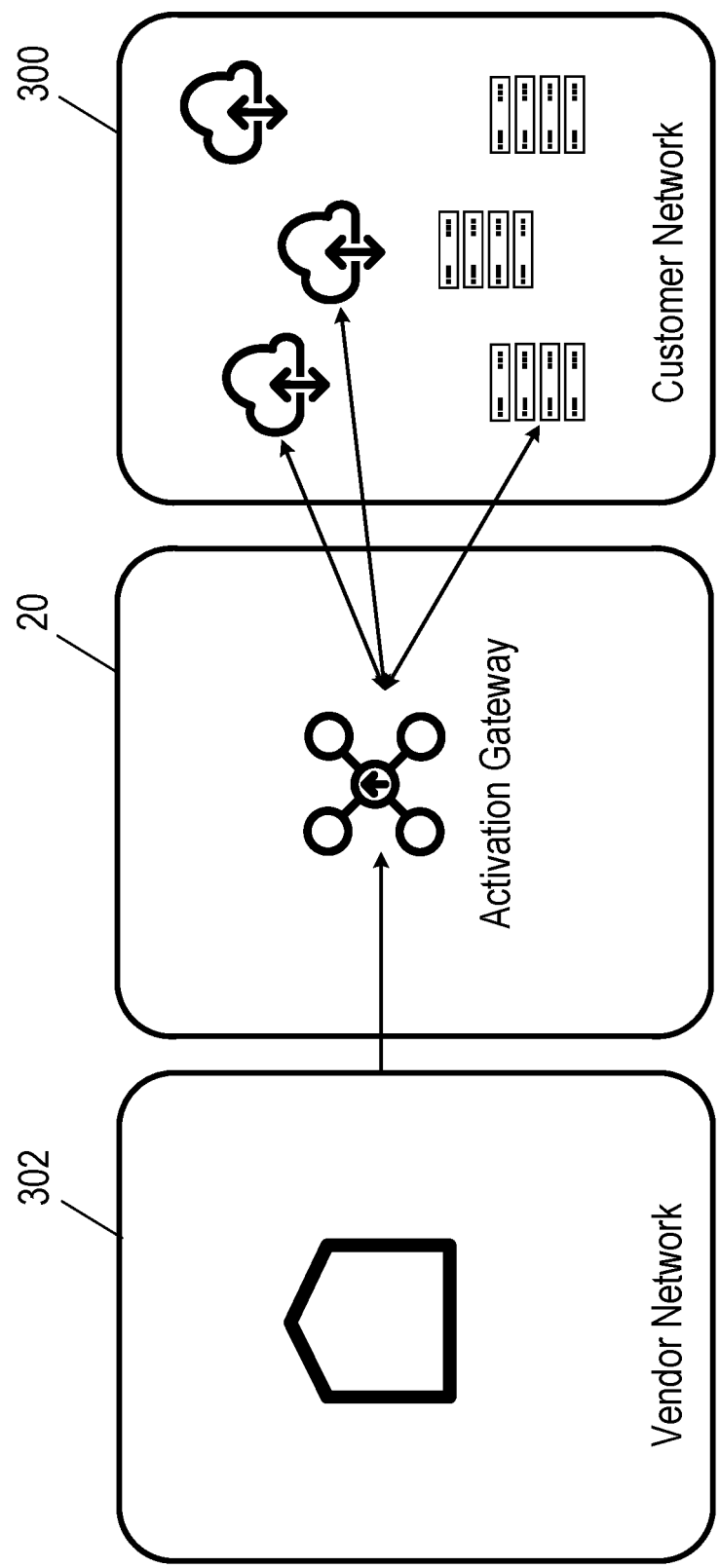
FIG. 5 is a block diagram illustrating a system according to an embodiment.

FIG. 5 illustrates a system in accordance with an embodiment. In the illustrated embodiment of FIG. 5, the system comprises the gateway 20 described herein. As illustrated in FIG. 5, the gateway 20 is configured to allow a first network 300 and a second network 302 to communicate. Although not illustrated in FIG. 5, in some embodiments, the system may also comprise the node 10 described herein. The node 10 is a node of the first network 300.

As illustrated in FIG. 5, in some embodiments, the first network 300 may be a network of a consumer of the network function (e.g. a customer network) and/or the second network 302 may be a network of a provider of the network function (e.g. a node of a vendor network). In embodiments where the second network 302 comprises the gateway 20 and is a provider (or vendor) of the network function, the provider of the network function has the ability to prevent usage of the first (or any other specific) version of the network function. In this way, the provider of the network function can avoid exposing the second network 302 to identified issues with (e.g. a security flaw or critical bug associated with) the first version of the network function. Moreover, the consumer of the network function can verify (e.g. directly) with the provider of the network function whether the first (or any other specific) version of the network function is activatable. In some embodiments, the gateway 20 described herein may be made available by each provider of the network function.

Figure 6:
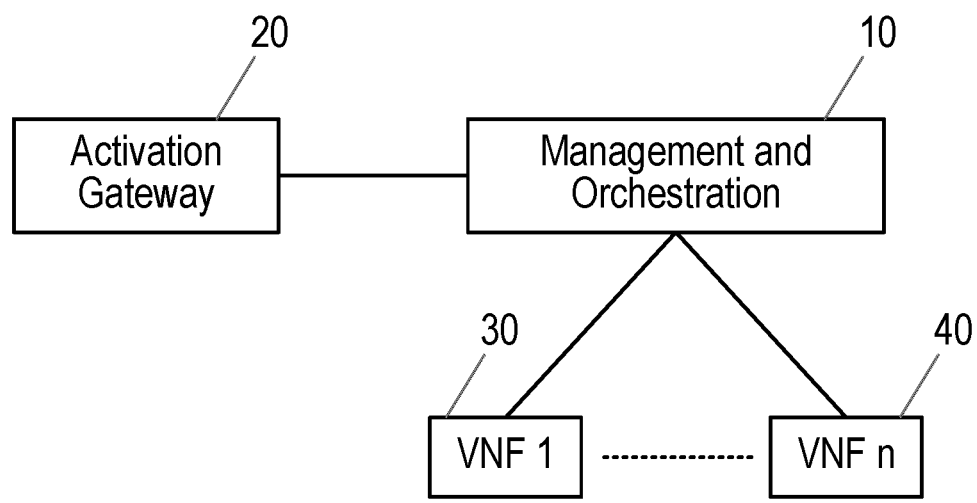
FIG. 6 is a block diagram illustrating a system according to an embodiment.

FIG. 6 illustrates a system in accordance with an embodiment. In the illustrated embodiment of FIG. 6, the system comprises the node 10 described herein and the gateway 20 described herein. As illustrated in FIG. 6, the system can also comprise one or more network functions 30, 40 in respect of which the method described herein is performed. In some embodiments, as illustrated in FIG. 6, one or more of the network functions 30, 40 may be a virtual network function (VNF).

Figure 7:
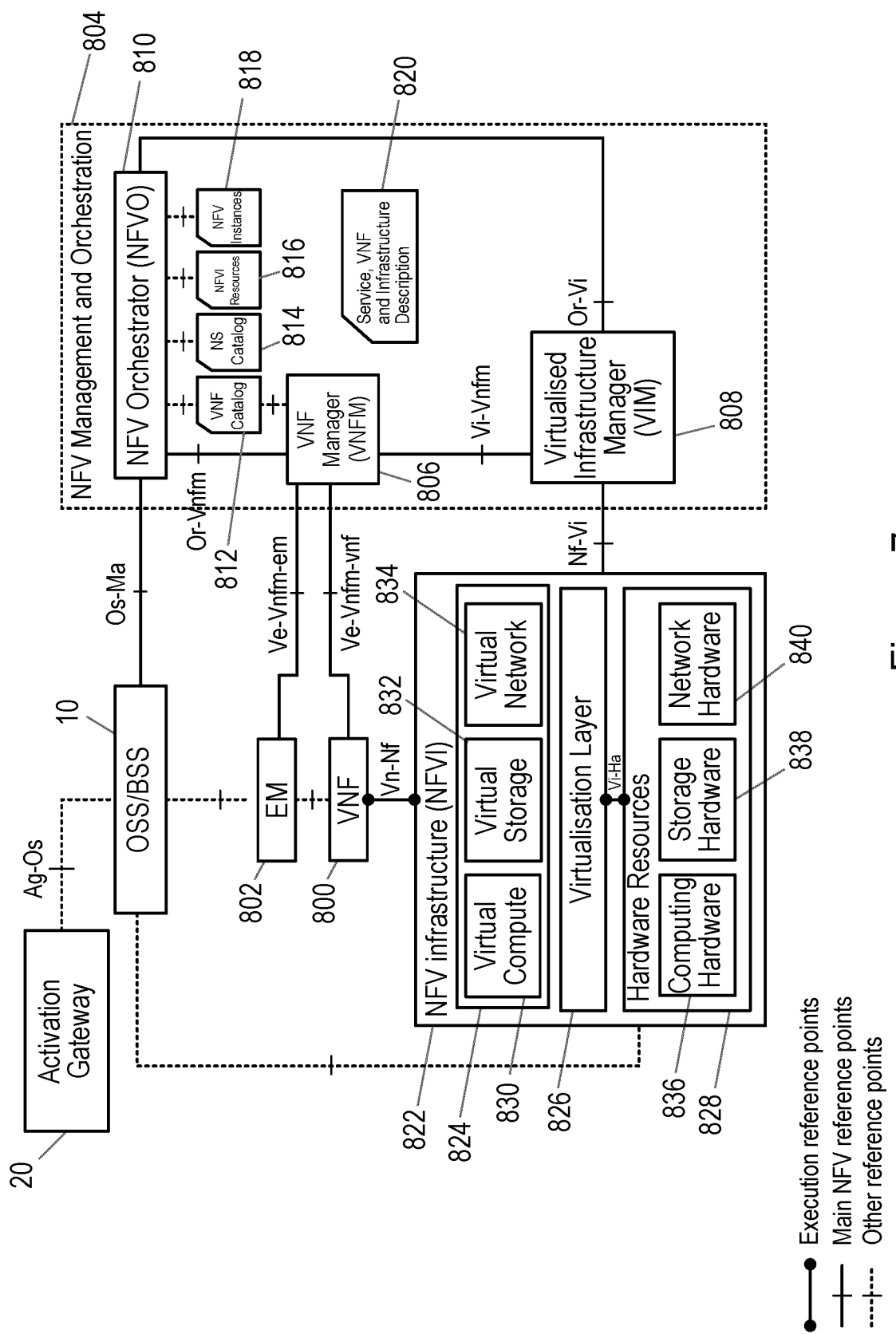
FIG. 7 is a block diagram illustrating a system according to an embodiment.

FIG. 7 illustrates a system in accordance with an embodiment. In the illustrated embodiment of FIG. 7, the system comprises the node 10 described herein and the gateway 20 described herein. As illustrated in FIG. 7, the system can also comprise a network function 800 in respect of which the method described herein is performed.

In some embodiments, as illustrated in FIG. 7, the network function 800 may be a virtual network function (VNF). The embodiment illustrated in FIG. 7 has a European Telecommunications Standards Institute (ETSI) network functions virtualization (NFV) architecture. However, it will understood that the method described herein can also be performed in respect of any other network architecture and a person skilled in the art will be aware of other such network architectures.

As illustrated in FIG. 7, in some embodiments, the system may also comprise an element manager (EM) 802 and a network functions management and orchestration node or a network functions virtualization management and orchestration node 804. This management and orchestration node 804 may comprise a network function manager (NFM) or a virtual network function manager (VNFM) 806, an infrastructure manager (IM) or virtual infrastructure manager (VIM) 808, a network functions orchestrator (NFO) or network functions virtualization orchestrator (NFVO) 810, a network function (NF) catalog or a virtual network function (VNF) catalog 812, a network service (NS) catalog 814, and one or more network functions infrastructure (NFI) resources or one or more network functions virtualization infrastructure (NFVI) resources 816, and one or more network functions (NF) instances or network functions virtualization (NFV) instances 818. The management and orchestration node 804 may also comprise a service, NF/VNF and infrastructure description 820.

As also illustrated in FIG. 7, in some embodiments, the system may comprise an NFI/NFVI node 822. This infrastructure node 822 can comprise a plurality of layers 824, 826, 828. The plurality of layers may include a layer 824 of hardware resources, for example, comprising computing hardware resources 830, storage hardware resources 832, and/or network hardware resources 834. In virtualised embodiments, the plurality of layers may include a layer 828 of virtual resources, for example, comprising virtual computing resources 836, virtual storage resources 838, and/or virtual network resources 840. In some of these embodiments, the plurality of layers may include a virtualisation layer 826. The virtualisation layer 826 can allow the hardware resources 836, 838, 840 and the virtual resources 830, 832, 834 to communicate with each another.

In the embodiment illustrated in FIG. 7, the node 10 may be an operations support system (OSS) node or a business support system (BSS) node. Thus, in this embodiment, the OSS/BSS node can be configured to operate in the accordance with the method described herein in respect of the node 10. In the embodiment illustrated in FIG. 7, the node 10 and the gateway 20 can communicate via an interface (or reference point), namely the Ag—Os interface. This interface provides a communication channel between the node 10 and the gateway 20. In the embodiment illustrated in FIG. 7, the node 10 and the gateway 20 can operate in the manner described herein. The other components of the system according to the embodiment illustrated in FIG. 7 operate in the manner that is standard in the art.

The node 10 and the gateway 20 can operate in the manner described herein. In some embodiments involving a record (e.g. a list) generated by the gateway 20 and comprising information indicative of whether activation of the first version of the network function by the node 10 is allowed or denied, the record may be installed (e.g. directly) in the NFO/NFVO 810 in the embodiment illustrated in FIG. 7. For example, in some of these embodiments, the node 10 (and thus a user of the node 10) may access the gateway 20, download the record and upload the record on the NFO/NFVO 810. As described earlier, in some embodiments, this may be performed at deployment (or installation) of the network function, at restart of the network function, and/or at predetermined time intervals (e.g. periodically). In embodiments where the record is signed by the gateway 20, the NFO/NFVO 810 may be configured to authenticate the source (the gateway) and check the integrity of the record. The record is then available in the NFO/NFVO 810 for the activation check to be performed by the node 10 in the manner described earlier.

Figure 8:
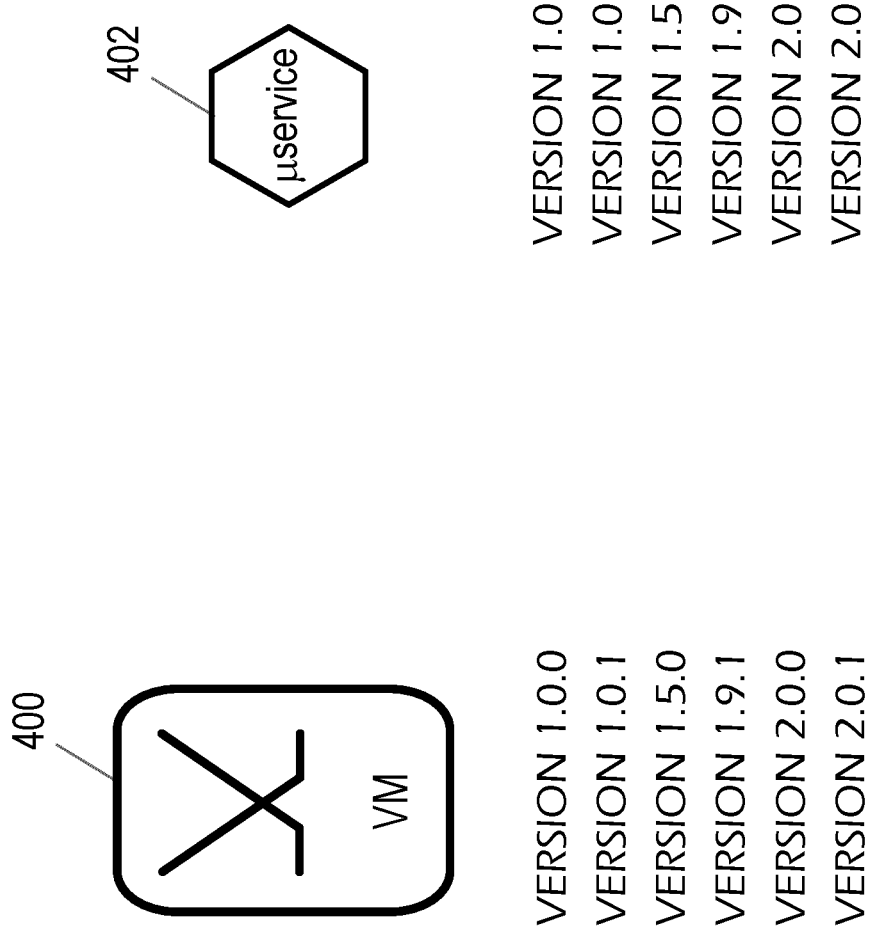
FIG. 8 is a block diagram illustrating a plurality of versions of a network function.

FIG. 8 illustrates an example of a plurality of versions of a network function 400, 402. As illustrated in FIG. 8, in some embodiments, a network function may be in the form of a virtual machine 400 or a microservice 402. In the example illustrated in FIG. 8, a plurality of versions of the network function 400, 402 are released (or pushed out). In some embodiments, the plurality of versions of the network function 400, 402 may be released as a list. There may be an issue (such as any of the issues described earlier) with any one or more of the plurality of versions of the network function 400, 402. For example, there may be a functional issue with any one or more of the plurality of versions of the network function 500 and/or a security issue with any one or more of the plurality of versions of the network function 500.

Figure 9:
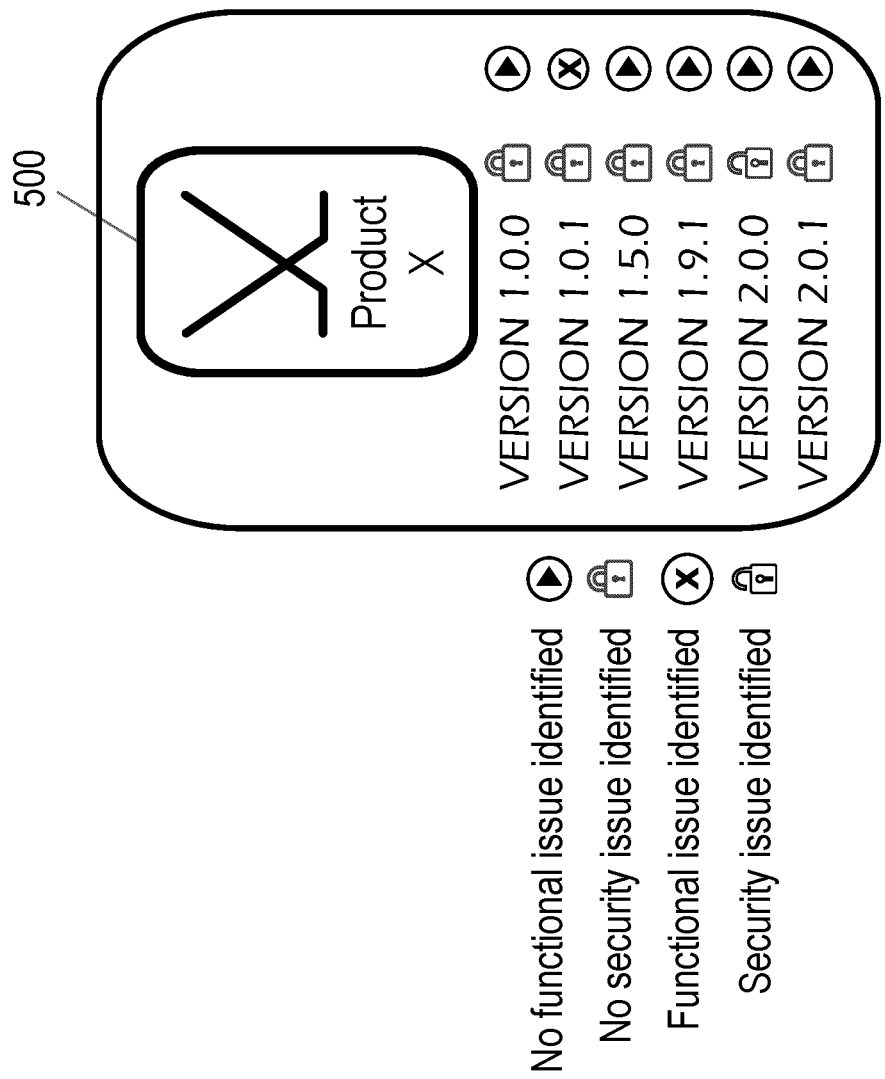
FIG. 9 is a block diagram illustrating a plurality of versions of a network function.

FIG. 9 illustrates another example of a plurality of versions of a network function 500. In the example illustrated in FIG. 9, there may be an issue (such as any of the issues described earlier) with any one or more of the plurality of versions of the network function 500. For example, there may be a functional issue with any one or more of the plurality of versions of the network function 500 and/or a security issue with any one or more of the plurality of versions of the network function 500. In the example illustrated in FIG. 9, a functional issue is identified with VERSION 1.0.1 of the network function 500 and a security issue is identified with VERSION 2.0.0 of the network function 500. There are no issues identified with the other versions of the network function 500 in the example illustrated in FIG. 9.

According to the method described herein, in the example illustrated in FIG. 9, activation of the versions of the network function 500 for which there is an issue identified is denied. For example, activation of VERSION 2.0.0 of the network function 500 for which there is a security issue identified is denied. In some embodiments, in this case, the VERSION 2.0.1 of the network function 500 for which there is no issue identified may be successfully activated instead.

Figure 10:
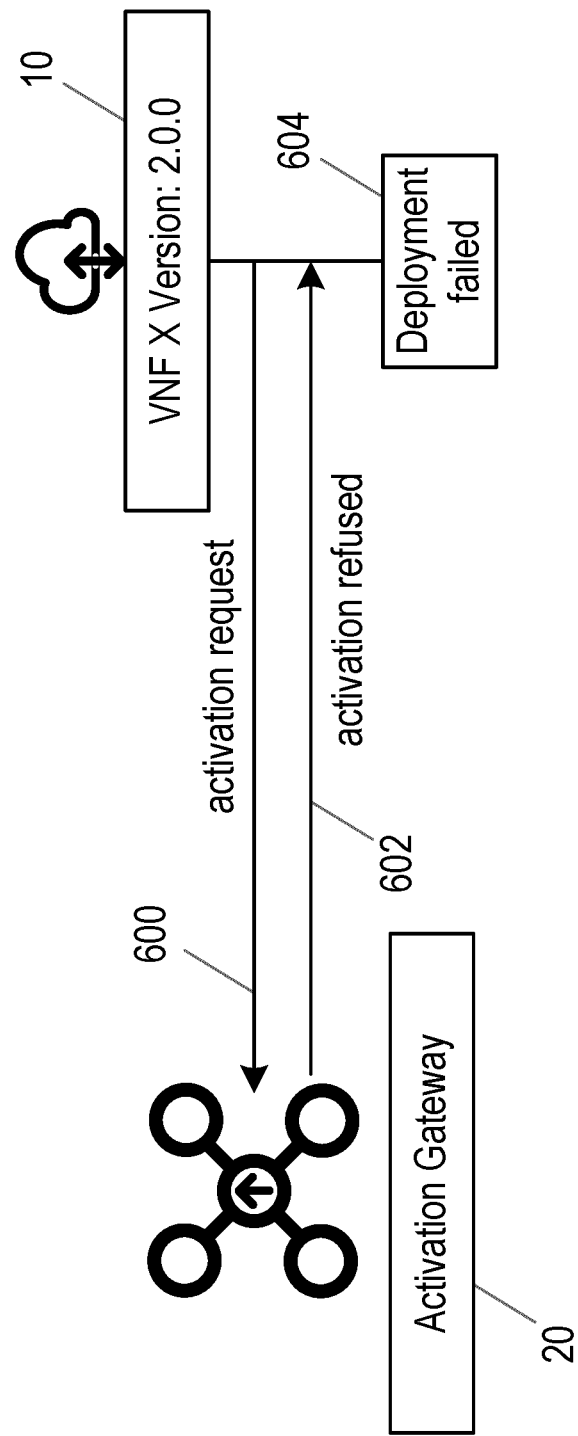
FIG. 10 is a signalling diagram illustrating an exchange of signals in a system according to an embodiment.

FIG. 10 is a signalling (or call flow) diagram illustrating an exchange of signals in a system according to an embodiment. The system illustrated in FIG. 10 comprises a node 10 as described earlier and a gateway 20 as described earlier.

As illustrated by arrow 600, in the illustrated embodiment, the node 10 (or, more specifically, the processing circuitry 12 of the node 10) initiates transmission of a request towards the gateway 20 in the manner described earlier. The request is for permission to activate the first version of the network function. The request may be referred to as an activation request.

In the manner described earlier, the gateway 20 (or, more specifically, the processing circuitry 22 of the gateway 20) allows or denies activation of the first version of the network function by the node 10 of the first network. In the illustrated embodiment of FIG. 10, this activation is allowed or denied in response to the request for permission for the node 10 of the first network to activate the first version of the network function. As illustrated by arrow 602, in the illustrated embodiment of FIG. 10, the gateway 20 (or, more specifically, the processing circuitry 22 of the gateway 20) initiates transmission of a response towards the node 10 of the first network indicative of whether activation of the first version of the network function by the node 10 of the first network is allowed or denied.

In the illustrated embodiment, the response is indicative that activation of the first version of the network function by the node 10 of the first network is denied (or refused). At block 604, the activation of the first version of the network function fails. This means that deployment of the first version of the network function fails and the first version of the network function is unable to provide its functionality.

Figure 11:
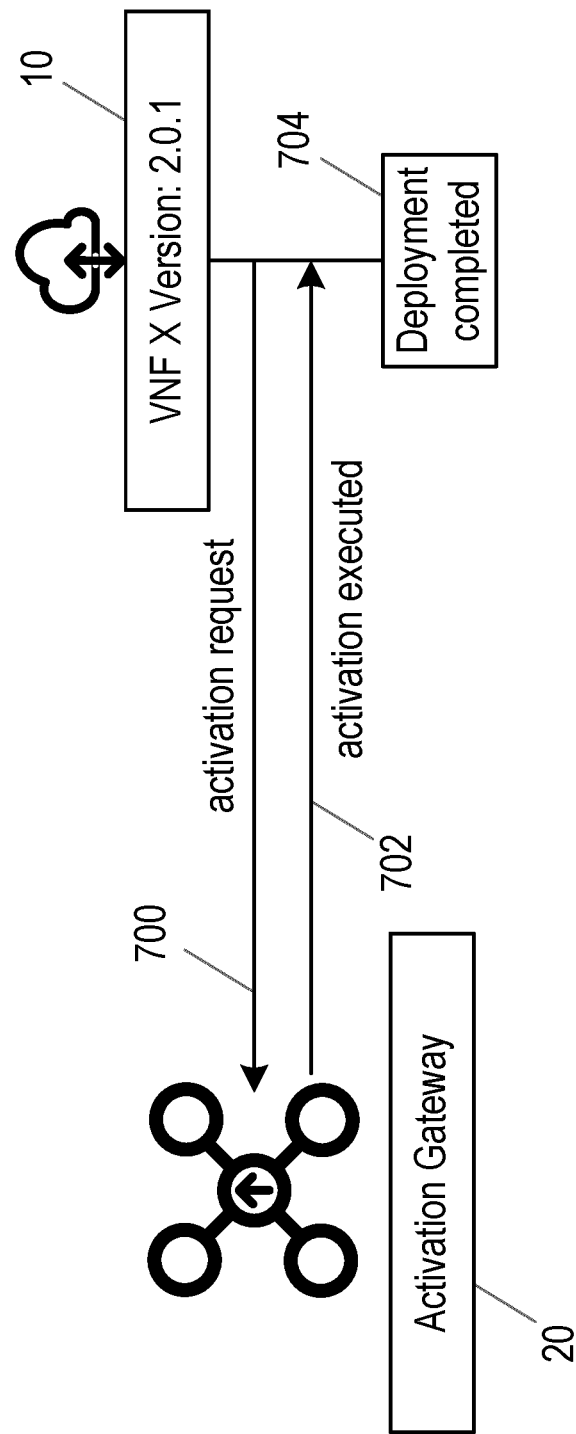
FIG. 11 is a signalling diagram illustrating an exchange of signals in a system according to an embodiment.

FIG. 11 is a signalling (or call flow) diagram illustrating an exchange of signals in a system according to an embodiment. The system illustrated in FIG. 11 comprises a node 10 as described earlier and a gateway 20 as described earlier.

In some embodiments, if activation of the first version of the network function is denied by the gateway 20, as illustrated in FIG. 10, the method may be repeated in respect of at least one second version of the network function, as illustrated in FIG. 11. In the embodiment illustrated in FIG. 11, the at least one second version of the network function is a later (or subsequent) release of the first version of the network function.

As illustrated by arrow 700, in the illustrated embodiment of FIG. 11, the node 10 (or, more specifically, the processing circuitry 12 of the node 10) initiates transmission of a request towards the gateway 20 in the manner described earlier. The request is for permission to activate the at least one second version of the network function. The request may be referred to as an activation request.

In the manner described earlier, the gateway 20 (or, more specifically, the processing circuitry 22 of the gateway 20) allows or denies activation of the at least one second version of the network function by the node 10 of the first network. In the illustrated embodiment of FIG. 11, this activation is allowed or denied in response to the request for permission for the node 10 of the first network to activate the at least one second version of the network function. As illustrated by arrow 702, in the illustrated embodiment, the gateway 20 (or, more specifically, the processing circuitry 22 of the gateway 20) initiates transmission of a response towards the node 10 of the first network indicative of whether activation of the at least one second version of the network function by the node 10 of the first network is allowed or denied.

In the illustrated embodiment of FIG. 11, the response is indicative that activation of the at least one second version of the network function by the node 10 of the first network is allowed. At block 704, the activation of the at least one second version of the network function is completed. This means that deployment of the at least one second version of the network function can be completed and the at least one second version of the network function is able to provide its functionality.

Figure 12:
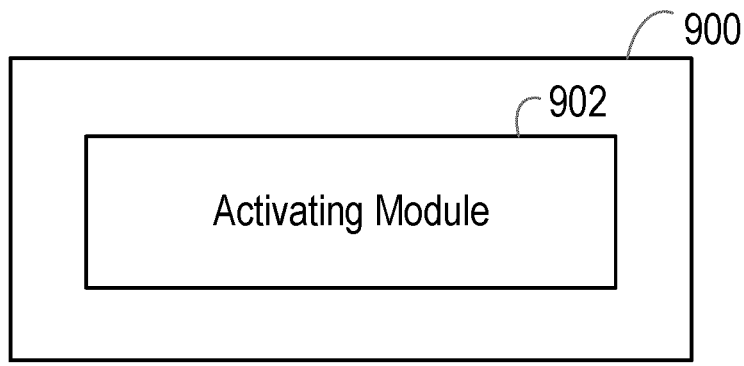
FIG. 12 is a block diagram illustrating a node according to an embodiment.

FIG. 12 is a block diagram illustrating a node 900 in accordance with an embodiment. The node 900 comprises an activating module 902 configured to activate a first version of a network function only if activation of the first version of the network function is allowed by a gateway that is configured to allow the first network and a second network to communicate. The node 900 may operate in the manner described herein.

Figure 13:
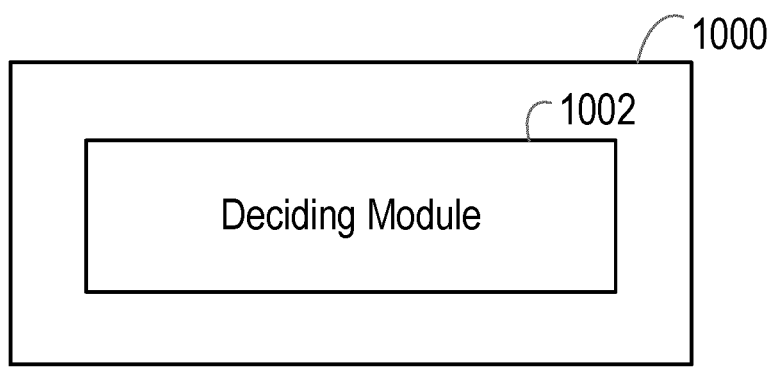
FIG. 13 is a block diagram illustrating a gateway according to an embodiment.

FIG. 13 is a block diagram illustrating a gateway 1000 in accordance with an embodiment. The gateway 1000 is configured to allow a first network and a second network to communicate. The gateway 1000 comprises a deciding module 1002 configured to allow or deny activation of a first version of a network function by a node 900 of the first network. The gateway 1000 may operate in the manner described herein.

There is also provided a computer program comprising instructions which, when executed by processing circuitry (such as the processing circuitry 12 of the node 10 described earlier and/or the processing circuitry 22 of the gateway 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the node 10 described earlier and/or the processing circuitry 22 of the gateway 20 described earlier) to cause the processing circuitry to perform at least part of the method described herein. There is provided a computer program product comprising a carrier containing instructions for causing processing circuitry (such as the processing circuitry 12 of the node 10 described earlier and/or the processing circuitry 22 of the gateway 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the node 10, 900 and/or gateway 20, 1000 functionality described herein can be performed by hardware. Thus, in some embodiments, the node 10, 900 described herein can be a hardware node and/or the gateway 20, 1000 described herein can be a hardware gateway. However, it will also be understood that at least part or all of the node and/or gateway functionality described herein can be virtualized. For example, the functions performed by the node 10, 900 described herein can be implemented in software running on generic hardware that is configured to orchestrate the node functionality and/or the functions performed by the gateway 20, 1000 described herein can be implemented in software running on generic hardware that is configured to orchestrate the gateway functionality. Thus, in some embodiments, the node 10, 900 described herein can be a virtual node and/or the gateway 20, 1000 described herein can be a virtual gateway. In some embodiments, at least part or all of the node functionality and/or gateway functionality described herein may be performed in a network enabled cloud. The node functionality described herein may all be at the same location or at least some of the node functionality may be distributed. Similarly, the gateway functionality described herein may all be at the same location or at least some of the gateway functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided a technique for network function management.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for network function management, the method performed by a node of a first network, the method comprising:
    activating a first version of a network function only if activation of the first version of the network function is allowed by a gateway that is configured to allow the first network and a second network to communicate.

2. The method of claim 1, the method comprising:
    initiating transmission of a request towards the gateway for permission to activate the first version of the network function; and
    activating the first version of the network function only if a response from the gateway to the request is indicative that activation of the first version of the network function is allowed.

3. The method of claim 2, wherein:
    the request comprises information uniquely identifying the first version of the network function.

4. The method of claim 1, the method comprising:
    activating the first version of the network function only if a record generated by the gateway comprises information indicative that activation of the first version of the network function is allowed.

5. The method of claim 1, wherein:
    the method is performed at deployment of the network function, or at restart of the network function, or at predetermined time intervals.

6. The method of claim 1, the method comprising:
    if activation of the first version of the network function is denied by the gateway, repeating the method in respect of at least one second version of the network function.

7. The method of claim 6, wherein:
    the method is repeated until a version of the network function for which activation is allowed is reached.

8. The method of claim 1, the method comprising:
    if activation of the first version of the network function is denied by the gateway and a third version of the network function is currently activated, continuing to activate the third version of the network function.

9. The method of claim 1, wherein:
    the first network is a network of a consumer of the network function; and
    the second network is a network of a provider of the network function.

10. A node of a first network, the node comprising:
    processing circuitry; and
    at least one memory for storing instructions which, when executed by the processing circuitry, cause the node to operate in accordance with claim 1.

11. A method of managing network functions, the method performed by a gateway configured to allow a first network and a second network to communicate, the method comprising:
    allowing or denying activation of a first version of a network function by a node of the first network.

12. The method of claim 11, the method comprising:
    allowing or denying activation of the first version of the network function by the node of the first network in response to a request for permission for the node of the first network to activate the first version of the network function; and
    initiating transmission of a response towards the node of the first network indicative of whether activation of the first version of the network function by the node of the first network is allowed or denied.

13. The method of claim 12, wherein:
    the request comprises information uniquely identifying the first version of the network function.

14. The method of claim 11, wherein:
    the method is performed at deployment of the network function, or at restart of the network function, or at predetermined time intervals.

15. The method of claim 11, wherein:
    allowing or denying activation of the first version of the network function by the node of the first network is based on whether an issue is identified with the first version of the network function, wherein the method comprises:
    allowing activation of the first version of the network function by the node of the first network in response to an absence of an issue being identified with the first version of the network function; or
    denying activation of the first version of the network function by the node of the first network if in response to an issue being identified with the first version of the network function.

16. The method of claim 11, wherein:
    allowing or denying activation of the first version of the network function by the node of the first network is based on a length of time since release of the first version of the network function, wherein the method comprises:
    allowing activation of the first version of the network function by the node of the first network if the length of the time since release of the first version of the network function is less than a predefined threshold length of time; or
    denying activation of the first version of the network function by the node of the first network if the length of the time since release of the first version of the network function is equal to or more than the predefined threshold length of time.

17. The method of claim 11, the method comprising:
if activation of the first version of the network function by the node of the first network is denied, repeating the method in respect of at least one second version of the network function.

18. The method of claim 17, wherein:
the method is repeated until reaching a version of the network function for which activation by the node of the first network is allowed.

19. The method of claim 11, wherein:
the first network is a network of a consumer of the network function; and
the second network is a network of a provider of the network function.

20. A gateway configured to allow a first network and a second network to communicate, the gateway comprising:
processing circuitry; and
at least one memory for storing instructions which, when executed by the processing circuitry, cause the gateway to operate in accordance with claim 11.

* * * * *